United States Patent [19]

Otake

[11] Patent Number: 4,755,123

[45] Date of Patent: Jul. 5, 1988

[54] METERING SYSTEM OF INJECTION MOLDING MACHINE

[75] Inventor: Hiromasa Otake, Tanashi, Japan

[73] Assignee: Fanuc Ltd, Minamitsuru, Japan

[21] Appl. No.: 3,403

[22] PCT Filed: Mar. 28, 1986

[86] PCT No.: PCT/JP86/00153

§ 371 Date: Jan. 28, 1987

§ 102(e) Date: Jan. 28, 1987

[87] PCT Pub. No.: WO86/05740

PCT Pub. Date: Oct. 9, 1986

[30] Foreign Application Priority Data

Mar. 28, 1985 [JP] Japan .................. 60-62140

[51] Int. Cl.⁴ .................. B29C 45/50; B29C 45/77
[52] U.S. Cl. .................. 425/145; 264/40.7; 264/328.1; 425/147; 425/587
[58] Field of Search .................. 425/136, 145, 147, 586, 425/587, 149, DIG. 4; 264/40.4, 40.7, 328.1

[56] References Cited

U.S. PATENT DOCUMENTS

| | | | |
|---|---|---|---|
| 3,666,141 | 5/1972 | Ma et al. | 425/587 X |
| 3,921,963 | 11/1975 | Neff et al. | 264/40.4 X |
| 3,941,534 | 3/1976 | Hunkar | 425/145 |
| 4,135,873 | 1/1979 | Sone et al. | 425/145 X |
| 4,326,255 | 4/1982 | Fujita | 425/145 X |
| 4,511,319 | 4/1985 | Takayama | 425/147 X |
| 4,579,515 | 4/1986 | Kawaguchi et al. | 425/136 |
| 4,592,712 | 6/1986 | Gutjahr | 425/145 |
| 4,615,669 | 10/1986 | Fujita et al. | 425/147 |

FOREIGN PATENT DOCUMENTS

| | | | |
|---|---|---|---|
| 224324 | 12/1984 | Japan . | |
| 174623 | 9/1985 | Japan . | |
| 804494 | 2/1981 | U.S.S.R. | 425/147 |

*Primary Examiner*—Richard L. Chiesa
*Attorney, Agent, or Firm*—Staas & Halsey

[57] ABSTRACT

A metering system of an injection molding machine which uses a numerical control unit (10), having a torque limit function, in order to control a rotating speed and a back pressure of a screw (1) in accordance with a screw position.

The numerical control unit (10) reads out, from a non-volatile memory (14), a screw rotating speed command value and a torque limit value in accordance with a screw position detected by an encoder (P1), and outputs the readout screw rotating speed command value and torque limit value to a second servo motor (M2), which rotates the screw (1), and to a first servo motor (M1), which drives the screw (1) in the axial direction, respectively.

5 Claims, 2 Drawing Sheets

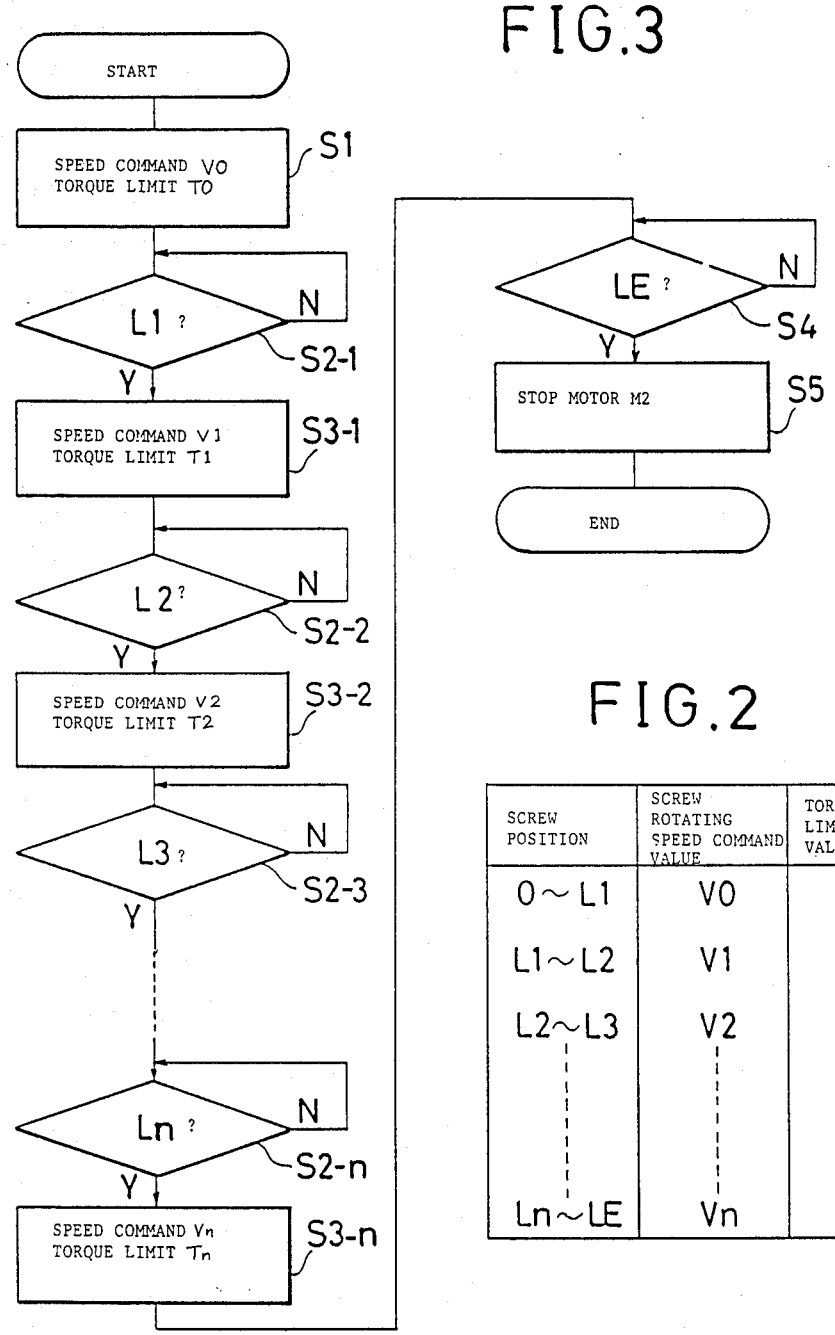

METERING SYSTEM OF INJECTION MOLDING MACHINE

BACKGROUND OF THE INVENTION

The present invention relates to an injection molding machine and, more particularly, to a metering system of an injection molding machine which can control the rotating speed and back pressure of a screw in accordance with the position of the screw when metering is performed.

Background Art

Although most of conventional injection molding machines can variably control the rotating speed of a screw, they apply a back pressure to the screw by a hydraulic pressure when metering is performed. Therefore, it is difficult to switch the value of the back pressure to arbitrary values as needed. When a molding material is to be homogeneously metered, the rotating speed of a screw must be controlled, and a back pressure must also be switched and controlled. Thus, since the conventional injection molding machines cannot easily switch the back pressure to various values, they cannot meter a molding material to sufficient homogeneity.

SUMMARY OF THE INVENTION

It is an object of the present invention to switch the back pressure applied to a screw to an arbitrary value by utilizing a torque limit function of a numerical control unit, in order to enable switching of the rotating speed and the back pressure of the screw in accordance with the position of the screw, thereby obtaining an optimum metering state of a molding material.

In order to achieve the above object, according to the present invention, a numerical control unit is provided which has a first servo motor for driving a screw of an injection molding machine in an axial direction, a second servo motor for rotating the screw, position detecting means for detecting a position of the screw, and memory means for storing a screw rotating speed command value and a torque limit value in correspondence with a screw position; and the numerical control unit also has a torque limit function. The numerical control unit reads out a screw rotating speed command value and a torque limit value from the memory means in accordance with the screw position detected by the position detecting means, and outputs the readout screw rotating speed command value to the second servo motor and the readout torque limit command value to the first motor, so that a predetermined screw rotation and back pressure can be obtained in accordance with a screw position.

In this manner, according to the present invention, drive of the screw in the axial direction and rotating drive of the screw are performed by the servo motors, the torque limit function of the numerical control unit is utilized to switch and control the back pressure in accordance with the screw position, and the rotating speed of the screw is also controlled. Therefore, a homogeneous metering state and an efficient metering can be obtained.

BRIEF DESCRIPTION OF THE DRAWINGS

FIG. 2 is a table stored in a non-volatile memory shown in FIG. 1; and

FIG. 3 is an operation flow chart of the injection molding machine shown in FIG. 1.

DESCRIPTION OF THE PREFERRED EMBODIMENT

Figure 1:
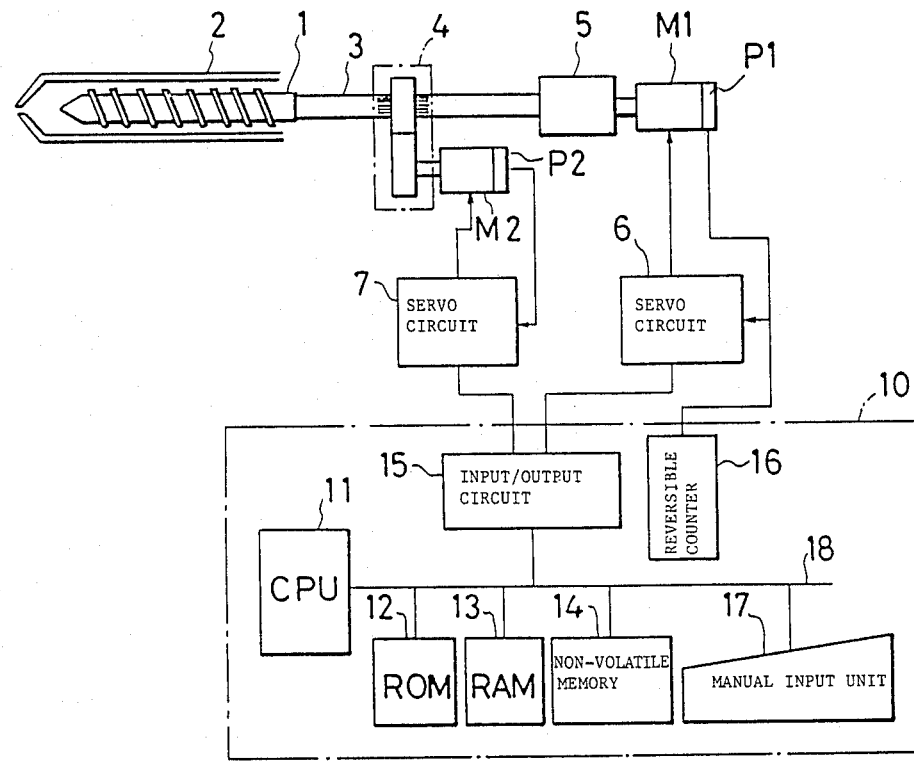
FIG. 1 is a view for showing an overall configuration of an injection molding machine to which an embodiment of the present invention is applied.

FIG. 1 shows an injection molding machine according to an embodiment of the present invention. Referring to FIG. 1, reference numeral 1 denotes a screw of the injection molding machine; 2, a heating cylinder; and 3, a screw shaft of the screw 1. The screw shaft 3 can be rotated by a second servo motor M2 for screw rotation through a transmission mechanism 4. The screw shaft 3 is also moved in the axial direction by a first servo motor M1 for injection through a transmission mechanism 5 so as to perform injection. Reference numeral 7 denotes a servo circuit for driving and controlling the servo motor M2. The servo circuit 7 controls the speed of the motor M2 by a speed command supplied from an input/output circuit 15 of a numerical control unit (to be referred to as a CNC hereinafter) 10 which incorporates a computer, and a feed-back signal supplied from an incremental-type encoder P2. Reference numeral 6 denotes a servo circuit for the servo motor M1. The servo circuit 6 drives and controls the servo motor M1 in accordance with a command supplied from the input/output circuit 15 of the CNC 10. Reference symbol P1 denotes an incremental-type encoder provided to the servo motor M1. An output from the encoder P1 is fed back to the servo circuit 7, and at the same time supplied to a reversible counter 16 of the CNC 10 as a position detection signal of the screw 1.

Reference numeral 10 denotes the CNC (numerical control unit incorporating a computer 11), as described above; 11, the computer (to be referred to as a CPU hereinafter); 12, a ROM storing a control program for controlling the injection molding machine; 13, a RAM used for temporarily storing data for the purpose of arithmetic operation and so on; and 14, a non-volatile memory. The non-volatile memory 14 stores rotating speed command values V0 to Vn for the screw 1, and torque limit values T0 to Tn for setting a back pressure, in correspondence with position regions 0 to L1, L1 to L2, ..., and Ln to LE of the screw 1. At least some of the speed command values V0 to Vn are different from each other, and at least some of the torque limit values T0 to Tn are different from each other. The input/output circuit 15 is connected to the servo circuits 6 and 7, as described above, and supplies a drive output from the CPU 11 to the servo motors M1 and M2. Reference numeral 16 denotes the reversible counter which counts the pulses from the encoder P1 provided to the servo motor M1 in order to detect the position of the screw 1; 17, a manual input unit for setting various commands and set values; and 18, a bus.

An operation of the injection molding machine having the above-described arrangement according to the embodiment of the present invention will be described with reference to the operation processing flow chart of FIG. 3.

The principle of metering control of the present invention resides in that rotational drive of the screw 1 and the supply of the back pressure are performed in accordance with the position of the screw 1 during metering. The servo motors M1 and M2 controlled by the CNC 10 are used for this purpose. In order to control rotation of the screw 1, the speed of the servo motor M2, which rotates the screw 1, is controlled. In order to control the back pressure, the output torque of the servo motor M1, which drives the screw 1 in the axial direction, is controlled by the torque limit function of the CNC 10.

First, assume that the metering process is started. The CPU 11 reads out, from the non-volatile memory 14, a screw rotation speed command value and a torque limit value T which correspond to a screw position. When metering is started, the position of the screw 1 is in the vicinity of "0"(a point is set as "0" where the screw 1 finishes injection and pressure holding and has moved to the distal end of the heating cylinder 2). Therefore, as shown in the table of FIG. 2, V0 and T0 are read out as the initial rotating speed command value and the initial torque limit values, respectively, and are supplied to the servo circuits 6 and 7 through the input/output circuit 15. As a result, the servo motor M2 is driven at a rotating speed (V0), a torque less than torque limit value T0 is output from the servo motor M1, and a back pressure is set by torque limit value T0 (step S1). Thereafter, the CPU 11 reads out the count of the reversible counter 16 to check whether the position of the screw 1 has reached switch point L1 (step S2-1). More specifically, when the screw 1 is driven and rotated by the servo motor M2, a molding material is plasticized and melted. The pressure of the molten material exceeds the output torque of the servo motor M1 limited by torque limit value T0, and moves the screw 1 backward (to the right in FIG. 1). A pulse is generated by the encoder P1 upon backward movement of the screw 1, and is counted by the reversible counter 16. The position of the screw 1 is thus detected by the reversible counter 16. When the count of the reversible counter 16 reaches switch point L1, next screw rotating speed command value V1 and torque limit value T0 are read out from the table shown in FIG. 2, and are supplied to the servo circuits 7 and 6, respectively (step S3-1). The screw 1 is thus rotated at the command speed (V1), and torque limit value T1 is supplied as a back pressure to drive the servo motor M1. Similarly, the CPU 11 reads the position of the screw 1 from the reversible counter 16. When the screw 1 reaches switch points L2, . . . , Ln, the CPU 11 reads out, from the non-volatile memory 14, screw rotating speed command values V2, . . . , Vn and torque limit values T2, . . . , Tn corresponding to the switch points, and outputs the values in order to control the servo motors M1 and M2 (steps S2-2 and S3-2 to steps S2-n and S3-n). When the value of the reversible counter 16 reaches metering end point LE (step S4), the servo motor M2 is stopped to stop rotation of the screw 1, thus completing metering.

As described above, according to the present invention, the rotating speed and the back pressure of the screw 1 can be arbitrarily controlled in accordance with the position of the screw 1. Therefore, in the above embodiment, the rotating speed and the back pressure of the screw 1 are switched in accordance with the position of the screw 1. However, this embodiment can be modified in various manners. For example, screw rotating speed command values V0 to Vn of FIG. 2 can be set to be the same so as to set the rotating speed of the screw 1 constant, while only a back pressure is changed. Alternatively, torque limit values T0 to Tn can be set to be the same so as to set the back pressure constant, while a rotating speed of the screw 1 is changed.

I claim:

1. A metering system of an injection molding machine, including a numerical control unit comprising:
    a first servo motor for diving a screw of the injection molding machine in an axial direction a second servo motor for rotating said screw;
    position detecting means for detecting a position of said screw; and
    memory means for storing a screw rotating speed command value and a torgure limit value in correspondence with a screw position, said numerical control unit having a torque limit function, said numercal control unit, during a metering process, reading out the screw rotating speed command value and the torque limit value from said memory means in accordance with the screw position detected by said position detecting means, and outputing the the readout screw rotating speed command value to said second servo motor and the readout torque limit command value to said first servo motor, thereby controlling a rotating speed of said screw in accordance with the screw position, and controlling an output torque of said first servo motor to a value below the readout torque limit command value for controlling a back pressure of said screw in accordance with said screw position.

2. A system according to claim 1, wherein said memory means stores the screw rotating speed command values and torque limit values corresponding to respective ones of a plurality of set screw position regions, and wherein said numerical control unit includes position discriminating means for discriminating one of the set screw position regions in which a screw position detected by said position detecting means falls, and reads out a screw rotating speed command value and a torque limit value corresponding to the discriminated screw position region from said memory means.

3. A system according to claim 2, wherein at least some of the torque limit values stored in said memory means corresponding to the respective set screw position regions are set to be different from each other.

4. A system according to claim 2, wherein at least some of the screw rotating speed command values stored in said memory means corresponding to the respective set screw position regions are set to be different from each other.

5. A system according to claim 4, wherein at least some of the torque limit values stored in said memory means corresponding to the respective set screw position regions are set to be different from each other.

* * * * *

UNITED STATES PATENT AND TRADEMARK OFFICE
CERTIFICATE OF CORRECTION

PATENT NO. : 4,755,123
DATED : July 5, 1988
INVENTOR(S) : HIROMASA OTAKE

It is certified that error appears in the above-identified patent and that said Letters Patent is hereby corrected as shown below:

Col. 4, line 19, "torgure" should be --torque--;

line 27, delete "the" (second occurrence).

Signed and Sealed this

Seventh Day of February, 1989

*Attest:*

DONALD J. QUIGG

*Attesting Officer*     *Commissioner of Patents and Trademarks*